United States Patent [19]

Fry et al.

[11] Patent Number: 5,363,495
[45] Date of Patent: Nov. 8, 1994

[54] DATA PROCESSING SYSTEM WITH MULTIPLE EXECUTION UNITS CAPABLE OF EXECUTING INSTRUCTIONS OUT OF SEQUENCE

[75] Inventors: Richard E. Fry, Round Rock; Troy N. Hicks, Austin, both of Tex.

[73] Assignee: International Business Machines Corporation, Armonk, N.Y.

[21] Appl. No.: 750,132

[22] Filed: Aug. 26, 1991

[51] Int. Cl.$^5$ .............................................. G06F 9/38
[52] U.S. Cl. ..................................... 395/375; 395/800
[58] Field of Search ......................... 395/325, 375, 800

[56] References Cited

U.S. PATENT DOCUMENTS

| | | | |
|---|---|---|---|
| 3,447,135 | 5/1969 | Calta et al. | 340/172.5 |
| 3,588,829 | 6/1971 | Boland et al. | 340/172.5 |
| 3,949,379 | 4/1976 | Ball | 340/172.5 |
| 3,962,706 | 6/1976 | Dennis et al. | 340/172.5 |
| 3,997,896 | 12/1976 | Cassarino, Jr. et al. | 340/172.5 |
| 4,128,882 | 12/1978 | Dennis . | |
| 4,130,885 | 12/1978 | Dennis . | |
| 4,153,932 | 5/1979 | Dennis et al. . | |
| 4,181,934 | 1/1980 | Marenin . | |
| 4,232,366 | 11/1989 | Levy et al. . | |
| 4,370,710 | 1/1983 | Kroft . | |
| 4,376,976 | 3/1983 | Lahti et al. . | |
| 4,507,728 | 3/1985 | Sakamoto et al. | 395/375 |
| 4,594,655 | 6/1986 | Hao et al. | 395/775 |
| 4,626,989 | 12/1986 | Torii | 395/375 |
| 4,630,195 | 12/1986 | Hester et al. . | |
| 4,675,806 | 6/1987 | Uchida . | |
| 4,734,852 | 3/1988 | Johnson et al. | 395/250 |
| 4,736,288 | 4/1988 | Shintani et al. | 395/375 |
| 4,752,873 | 6/1988 | Shonai et al. | 395/800 |
| 4,763,294 | 8/1988 | Fong | 364/748 |
| 4,773,041 | 9/1988 | Hassler et al. | 395/400 |
| 4,855,947 | 8/1989 | Zmyslowski et al. | 395/375 |
| 4,858,105 | 8/1989 | Kuriyama et al. | 395/375 |
| 4,903,196 | 2/1990 | Pomerene et al. | 395/375 |
| 4,916,606 | 4/1990 | Yamaoka et al. . | |
| 4,916,652 | 4/1990 | Schwarz et al. | 366/748 |
| 4,942,525 | 6/1990 | Shintani et al. | 395/375 |
| 4,956,800 | 12/1990 | Kametani | 364/736 |
| 5,075,840 | 12/1991 | Grohoski | 395/800 |
| 5,093,908 | 3/1992 | Beacom et al. | 395/375 |
| 5,133,077 | 6/1992 | Karne et al. | 395/800 |
| 5,150,469 | 9/1992 | Jouppi | 395/375 |
| 5,150,470 | 9/1992 | Hicks et al. | 395/375 |
| 5,197,137 | 3/1993 | Kumar et al. | 395/375 |
| 5,214,763 | 5/1993 | Blaner et al. | 395/375 |

FOREIGN PATENT DOCUMENTS

| | | |
|---|---|---|
| 0284364A2 | 3/1988 | European Pat. Off. . |
| 0312764A2 | 9/1988 | European Pat. Off. . |
| 0437044A2 | 12/1990 | European Pat. Off. . |

OTHER PUBLICATIONS

Proceedings, Twentieth Annual Allerton Conference on Communication, Control, and Computing, H. V. Poor et al, Conference held Oct. 6–8, 1982, Allerton House, Monticello, Ill., pp. 577–586.

IBM Technical Disclosure Bulletin, vol. 25, No. 1, Jun. 1982, pp. 136–137, "New Condition Code and Branch Architecture for High Performance Processors".

(List continued on next page.)

Primary Examiner—Parshotam S. Lall
Assistant Examiner—Viet Vu
Attorney, Agent, or Firm—Thomas E. Tyson; Michael A. Davis, Jr

[57] ABSTRACT

A data processing system is provided that includes a plurality of execution units each including independent circuits for storing and executing instructions. A circuit is also included for providing instructions from a sequence of instructions to the execution units where each instruction is provided to only one of the execution units. The system includes a circuit for detecting when an instruction in a first execution unit must complete execution prior to execution of an instruction in a second execution unit to produce correct results. A circuit is further included, responsive to the circuit for detecting, for delaying executing the instruction in the second execution unit until the instruction in the first execution unit has completed execution.

18 Claims, 7 Drawing Sheets

OTHER PUBLICATIONS

*IBM Technical Disclosure Bulletin*, vol. 29, No. 7, Dec. 1986, pp. 3176–3177, "Condition Code Facility".

*IBM Technical Disclosure Bulletin*, vol. 31, No. 2, Jul. 1988, pp. 294–296, "Multiple Queued Condition Codes".

*IBM Technical Disclosure Bulletin*, vol. 32, No. 7, Dec. 1989, pp. 109–113, "Device for Synchronizing Multiple Processors".

"The 801 Minicomputer" by George Radin, first published in *ACM Sigarch Computer Architecture News*, vol. 10, No. 2; also published in *IBM Journal of Research and Development*, vol. 27, No. 3, pp. 237–246, May 1983.

"Data-Flow IC Makes Short Work of Tough Processing Chores", *Electronic Design*, May, 17, 1984, pp. 191–206.

"A Preliminary Architecture for a Basic Data-Flow Processor" by Jack Dennis and David Misunas, published by IEEE in the *Proceedings of the 2nd Annual Symposium on Computer Architecture*, 1975, pp. 126–132.

"A Data Flow Multiprocessor", *IEEE Transactions on Computers* by James Rumbaugh, vol. C-26, No. 2, Feb. 1977, pp. 138–146.

"The Piecewise Data Flow Architecture: Architectural Concepts", *IEEE Transactions on Computers*, vol. C-32, No. 5, May 1983, pp. 425–438.

*The Data Control 6600* by Thornton, pp. 6–7 and 124–141.

"The Metaflow Architecture", Popescu et al, IEEE pp. 10–13, 63–73, Jun. 1991.

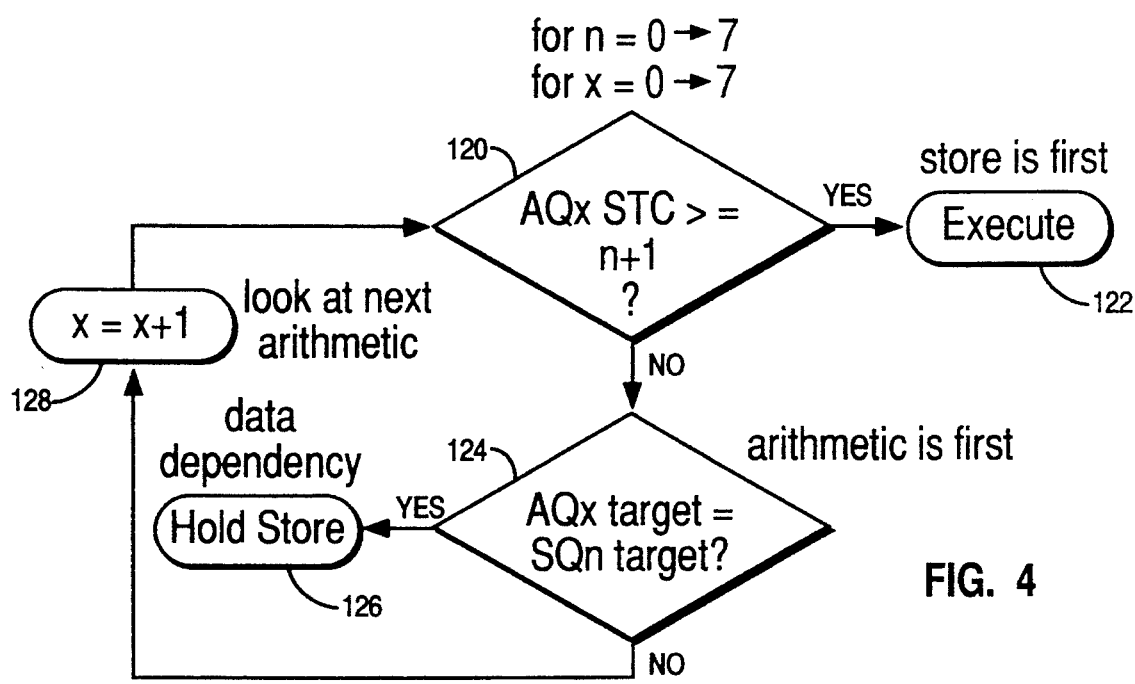

INSTRUCTION SEQUENCE
store 2
add 3 ← 0 + 1
add 4 ← 1 + 3

INSTRUCTION SEQUENCE
add 2 ← 0 + 1
add 4 ← 1 + 3
store 2
store 3

DATA PROCESSING SYSTEM WITH MULTIPLE EXECUTION UNITS CAPABLE OF EXECUTING INSTRUCTIONS OUT OF SEQUENCE

BACKGROUND OF THE INVENTION

1. Field of the Invention

This invention relates to data processing systems and, more specifically, to the parallel execution of instructions out of sequence in a data processing system with multiple execution units.

2. Description of the Related Art

Data processing systems have historically required instructions to be executed sequentially. It is, of course, advantageous to execute instructions in a data processing system as quickly as possible. One method, in the prior art, for speeding the execution of instructions has been to use one execution unit and increase its throughput. A second method has been to use multiple execution units and execute instructions in parallel as much as possible. When executing instructions in parallel in multiple execution units, it is necessary to provide a method to handle data dependencies between instructions.

A method for handling data dependencies in a non-parallel data processing system is disclosed in U.S. Pat. No. 4,630,195, entitled "Data Processing System with CPU Register to Register Data Transfers Overlapped with Data Transfer to and from Main Storage." This method uses tags on registers to determine whether a register to be used by an instruction is the subject of a pending I/O instruction. If the register is free, the instruction can execute without waiting for the I/O instruction to complete. This method, however, does not involve a parallel processing scheme.

One method to handle data dependencies in a parallel data processing system is to express programs according to data flow. An example of this method is disclosed in an article in *IEEE Transactions on Computers*, Vol. C-26, No. 2, Feb. 2, 1977, pages 138–146, entitled "A Data Flow Multiprocessor". Instructions are separated into modules according to the operands each requires. If an instruction is dependent upon a second instruction, it is laced in the same module as the second instruction Each module is self-contained and produces no side effects because all data dependencies are included. Thus, multiple processors are free to concurrently execute modules. The drawback of the method is that it requires a unique data flow language that is quite different from conventional systems.

A second method for handling instructions in a parallel data processing system is to synchronize the processors. An article in the *IBM Technical Disclosure Bulletin*, Vol. 32, No 7, December 1989, pp. 109–113, entitled "Device for Synchronizing Multiple Processors" discloses a device for synchronizing multiple processes. The device is capable of barrier synchronization and of serialization of multiple requests from processes. Barrier synchronization is a point in a sequence of instructions that all processes must reach before any process can pass the barrier. A serialization operation is an operation that assigns a unique integer to each of multiple simultaneous requests to indicate priority or to assign each process a unique set of system resources. This method suffers from the fact that it is too rigid and does not allow instructions to execute out of their original sequence.

U.S. Pat. No. 4,763,294, entitled "Method end Apparatus for Floating Point Operations", discloses an apparatus for synchronizing a fixed point processor and a floating point processor depending upon the type of instruction. The floating point instructions are either a member of a first group of instructions requiring interlock or a second group not requiring interlock. In either case, the fixed point unit controls the dispatch of floating point instructions and must wait for the floating point processor to be idle. Thus, the fixed point processor always sees the instructions in their original sequence.

U.S. Pat. No. 4,916,606, entitled "*Pipelined Parallel Data Processing Apparatus for Directly Transferring Operand Data between Preceding and Succeeding Instructions*", discloses an apparatus that detects when an instruction will use the result of a previous instruction and provides the data directly to the succeeding instruction. This speeds execution by vitiating the step of retrieving data but does not allow parallel processing instructions out of sequence.

U.S. Pat. No. 4,956,800, entitled "*Arithmetic Operation Processing Apparatus of the Parallel Processing Type and Compiler which is Used in this Apparatus*", discloses an apparatus for performing arithmetic operation processes at a high speed by enabling the execution sequence and the input/output sequence in parallel. This speeds execution, but the instructions are still executed in sequence.

None of the references detailed above describe a mechanism that provides parallel execution of instructions out of sequence in independent execution units where an execution unit is delayed only when the correct execution of an instruction in one execution unit is dependent upon the completed execution of an instruction in a second execution unit.

SUMMARY OF THE INVENTION

In accordance with the present invention, a data processing system is provided that includes a plurality of execution units each including independent circuits for storing and executing instructions. A circuit is also included for providing instructions from a sequence of instructions to the execution units where each instruction is provided to only one of the execution units. The system includes a circuit for detecting when an instruction in a first execution unit must complete execution prior to execution of an instruction in a second execution unit to produce correct results. A circuit is further included, responsive to the circuit for detecting, for delaying executing the instruction in the second execution unit until the instruction in the first execution unit has completed execution.

In a preferred embodiment, a data processing system is provided in which the instructions belong to one of a plurality of classes of instructions and each execution unit is dedicated to executing one class of instructions. The system further includes a circuit for determining the class of each instruction and a circuit for providing instructions belonging to a class to the execution unit dedicated to executing that class of instructions. A circuit is also included for associating with each instruction in a first execution unit the number of instructions in a second execution unit that preceded it in the original sequence. Finally, a circuit is included (1) for delaying executing an instruction in the first execution unit only if the count associated with the instruction is non-zero and an instruction in the second execution unit that preceded the instruction must execute prior to it to produce correct results, and (2) for delaying executing an instruction in the second execution unit only if the count associated with an instruction in the first execution unit is less than or equal to a number of instructions in said second execution unit that precede said instruction in said second execution unit and the instruction in the first execution unit must execute prior to he instruction in the second execution unit to produce correct results.

BRIEF DESCRIPTION OF THE DRAWINGS

The novel features believed characteristic of the invention are set forth in the appended claims. The invention itself, however, as well as other features and advantages thereof, will be best understood by reference to the following description of the preferred embodiment, when read in conjunction with the accompanying figures, wherein:

FIG. 4 is a flow chart illustrating the control of all the instructions in the queue in the store instruction execution unit;

FIG. 5 is a flow chart illustrating the control of the instruction in the bottom position of the queue in the arithmetic instruction execution unit;

DESCRIPTION OF THE PREFERRED EMBODIMENT

In the present invention, a data processing system is provided that is capable of independently executing instructions in separate execution units in the floating point unit. Consequently, instructions can be executed out of sequence. The separate execution units wait for each other only in the case where two instructions, in different execution units, must be executed in sequence because the correct result of one is dependent upon the completed execution of the other.

Figure 1:
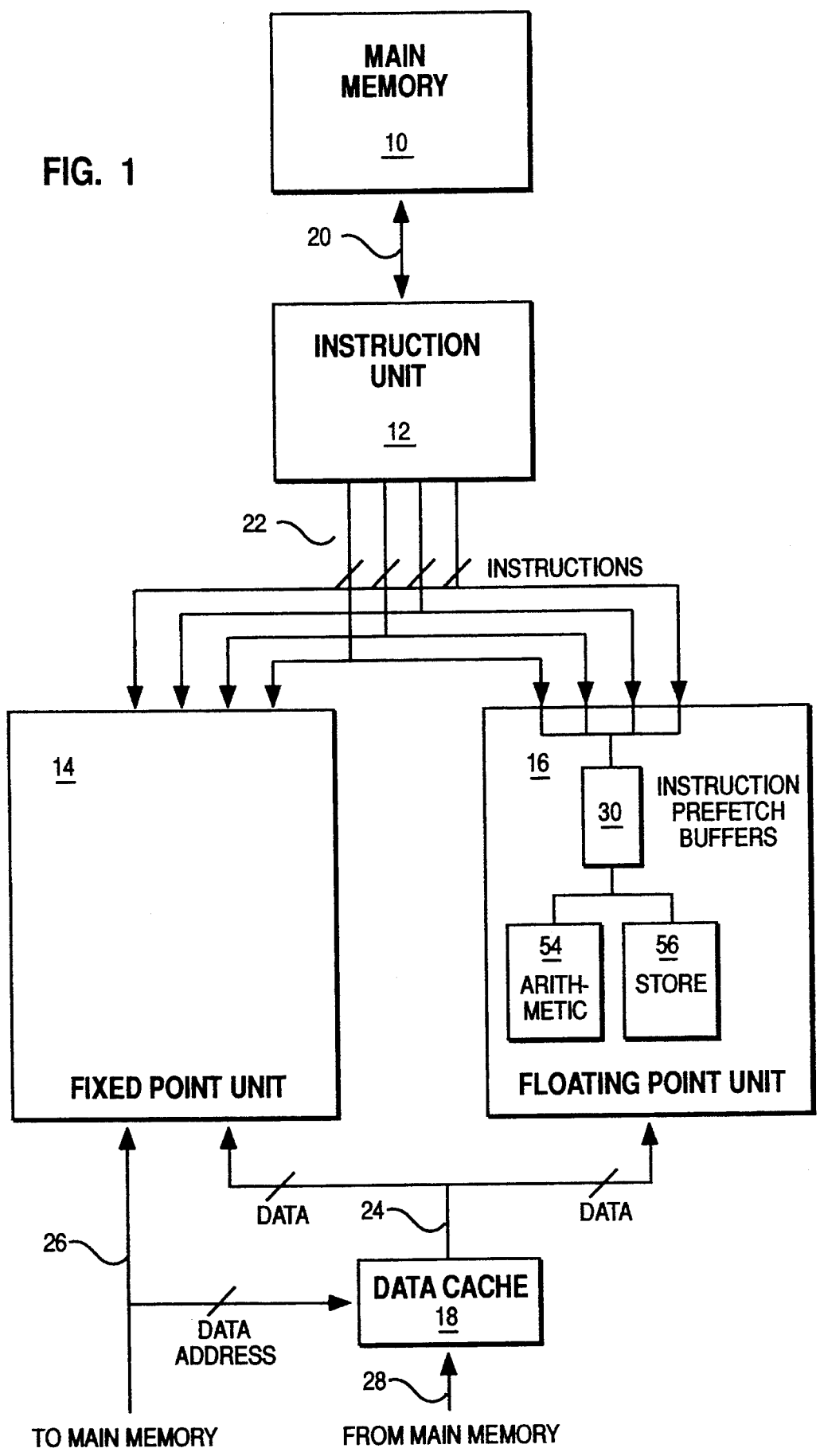
FIG. 1 is a block diagram illustrating the components of the data processing system.

FIG. 1 is a block diagram of the data processing system of the preferred embodiment. The system includes a main memory (10), an instruction unit (12), a fixed point unit (14), a floating point unit (16), and a data cache (18). The main memory is connected to the instruction unit by the memory bus (20). The instruction unit is connected to the fixed point unit and floating point unit by the instruction bus (22). The floating point and fixed point units are interconnected by the data bus (24) and are connected to the data cache also by the data bus (24). The fixed point unit is connected to the main memory and to the data cache by the data address bus (26). The data cache unit is connected to main memory by the bus (28).

In the preferred embodiment, the instruction unit functions as local high speed storage for instructions. It takes instructions from the main memory and dispatches them to the fixed point and floating point units. The fixed point and floating point units synchronously execute their respective instructions. Within the floating point unit are instruction prefetch buffers (30), an arithmetic execution unit (54), and a store execution unit (56). The function of each of these elements is discussed with respect to FIG. 2. If data is to be stored to or loaded from memory, the fixed point unit places the address on the address bus (26). The data is transferred on the data bus (24). The data cache functions as local high speed storage for data and interfaces with main memory on the bus (28).

Figure 2:
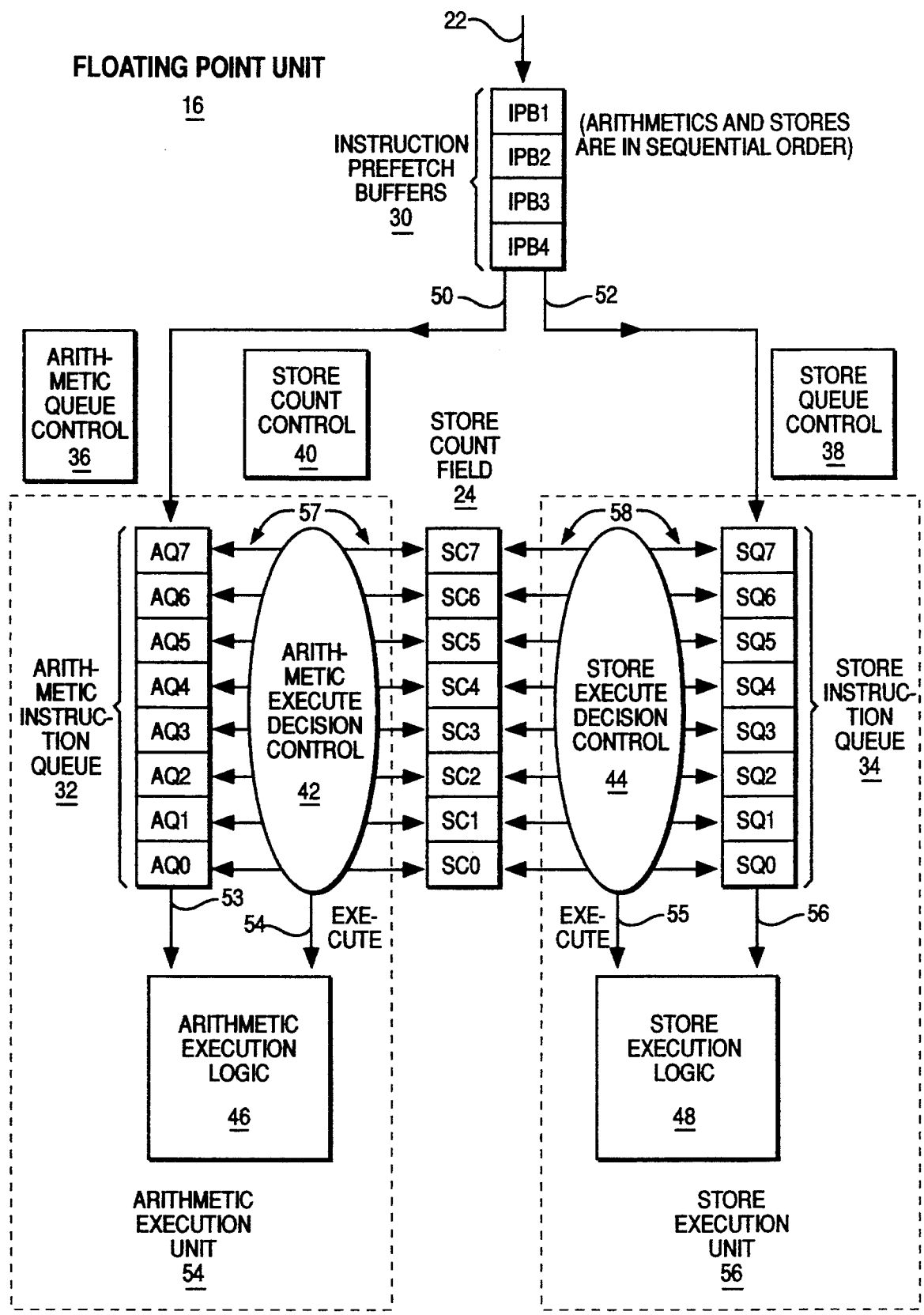
FIG. 2 is a block diagram illustrating the floating point unit and its separate arithmetic and store execution units.

FIG. 2 is a block diagram of the floating point unit (16) of FIG. 1. The Instruction Prefetch Buffers (30) sequentially store instructions from the instruction bus (22) sent by the Instruction Unit (12 in FIG. 1). The Instruction Prefetch Buffers (IPB's) store instructions four at a time with the first instruction in sequence stored in IPB1 and the last in IPB4. The Arithmetic Queue Control (36) and the Store Queue Control (38) select the instructions out of the IPB's and provide them to the Arithmetic Execution Unit (54) and the Store Execution Unit (56), respectively, on buses (50) and (52).

When an arithmetic instruction is moved into the Arithmetic Execution Unit, the Store Count Control (40) makes a count of the number of store instructions that precede it in the Store Execution Unit. The Store Count Control then sets the associated Store Count Field (24). The count made by the Store Count Control is called a "store count". The Store Count Field has one element to hold the store count associated with each arithmetic instruction in the Arithmetic Execution Unit. When a store instruction is executed, the Store Count Control decreases the store counts in the Store Count Field by one.

The Arithmetic Execution Unit (ArEU) includes the Arithmetic Instruction Queue (32), the Arithmetic Execution Logic (46), and the Arithmetic Execute Decision Control (42). Similarly, the Store Execution Unit (StEU) includes the Store Instruction Queue (34), the Store Execution Logic (48), and the Store Execute Decision Control (44). The Arithmetic Instruction Queue (AQ) and the Store Instruction Queue (SQ) store the instructions that are provided to the ArEU and the StEU, respectively. The Arithmetic Execute Logic (ArEL) and the Store Execute Logic (StEL) execute the instructions. The Arithmetic Execute Decision Control (ArEDC) and the Store Execute Decision Control (StEDC) function to control when an instruction in the AQ and the SQ can be executed. The ArEDC provides an execute signal on line (54), and the StEDC provides an execute signal on line (55). Instructions are transferred to the ArEL and the StEL on buses (53) and (55), respectively.

The ArEDC and the StEDC each control the execution of instructions in their respective execution units by referencing the Store Count Field and the instructions in the two instruction queues as shown by lines (57) and lines (58). Beginning with the instruction in the bottom position in the queue, each decision control checks whether one of the instructions in the bottom two positions of the queue can be executed. The decision control must delay the execution of an instruction only if it detects a dependency between the instruction and one of the instructions in the queue of the other execution unit.

The two decision controls use the store count associated with each instruction in the AQ to determine which instructions might be dependent. For example, the ArEDC knows that if the store count of an instruction is zero, no stores are in front of that instruction, and it can be executed. However, if the store count of an instruction is greater than zero, the ArEDC must check whether the instruction will write over the target of one of the store instructions that preceded it. The StEDC knows that if the store count of an arithmetic instruction is not zero, the instruction was preceded by store instructions, and a store can be executed. On the other hand, if the store count of an arithmetic instruction is zero, the StEDC must check if the arithmetic will be writing to the target of the store instruction that it wants to execute. If not, the store instruction can be executed, but if the store is storing the target of the arithmetic instruction, the store must wait until that arithmetic instruction executes.

Figure 3:
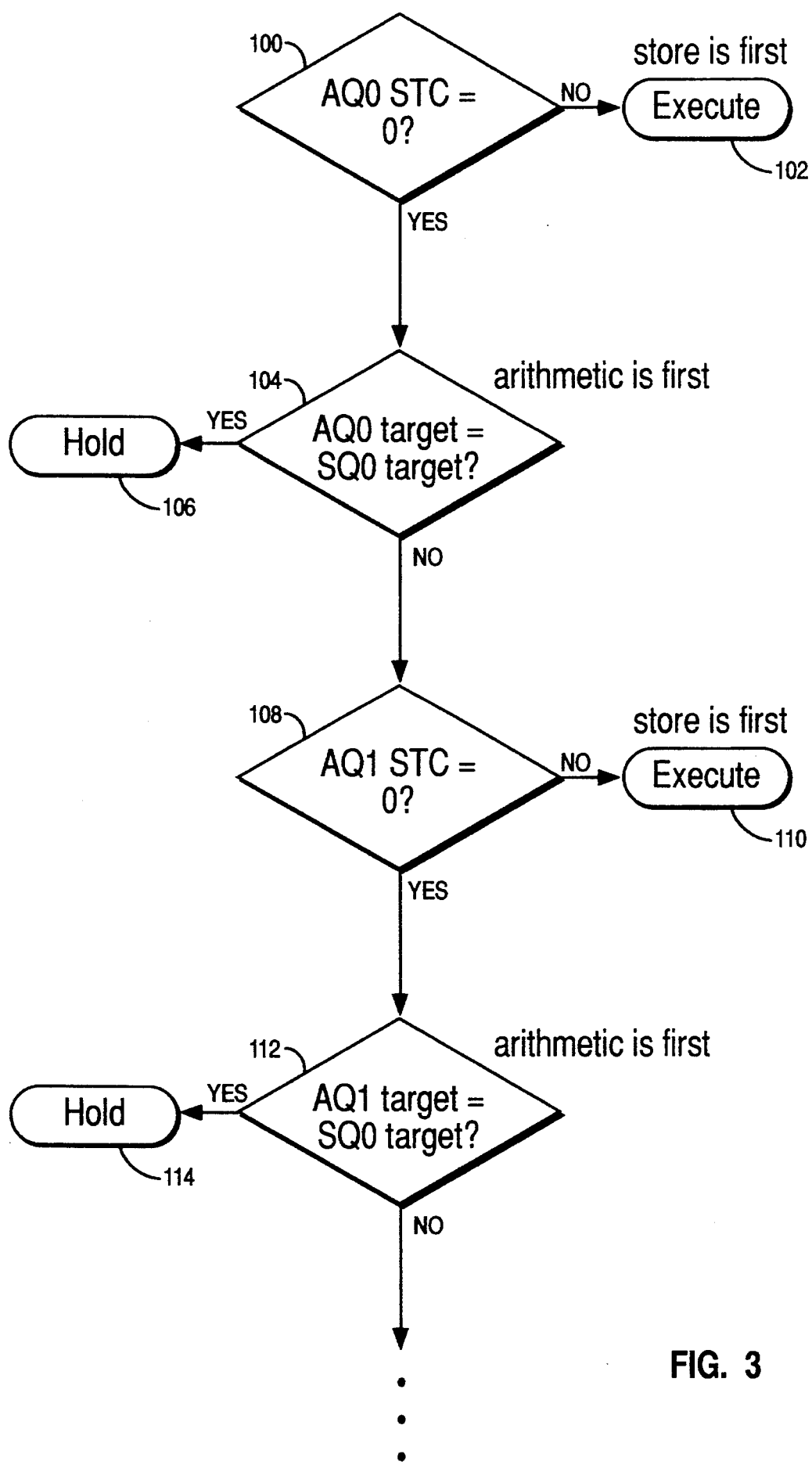
FIG. 3 is a flow chart illustrating the control of the instruction in the bottom position of the queue in the store instruction execution unit.

FIG. 3 is a flow chart of how the Store Execute Decision Control checks the instructions in the Store Instruction Queue. This figure shows the first few steps of checking the store instruction in SQ0. Initially, in step (100) the StEDC checks the store count of the arithmetic in AQ0. If the store count is not equal to zero, then the store came first in sequence, and the StEDC can go to step (102) and execute the store instruction. If the store count is equal to zero, then the arithmetic came first, and the StEDC must go to step (104) and compare the target register of the AQ0 arithmetic with the target register of the SQ0 store. If the targets match, then the store must be delayed in step (106). If the targets do not match, then the StEDC goes to step (108) and checks the store count of the instruction in AQ1. As before, if the store count is not equal to zero, then the store came first, and the StEDC can execute the store instruction in step (110). If the store count of the instruction in AQ1 is zero, then the store decision control must check whether or not the target register of the arithmetic in AQ1 is the same as the target register of the store in SQ0. If they are the same, the StEDC must go to step (114) and delay execution. If not, the StEDC continues to the arithmetic in AQ2. This process continues until all the instructions in the arithmetic queue have been checked. If the store target register does not match any of the AQ target registers, the store can be executed even though it followed arithmetics in the original sequence.

FIG. 4 is a flow chart showing a condensed version of FIG. 3 for checking all of the instructions in the Store Instruction Queue. In FIG. 4, the variable "x" stands for the position in the Arithmetic Instruction Queue and runs from 0 to 7. The variable "n" stands for the position in the Store Instruction Queue and also runs from 0 to 7. In the first iteration of step (120), "n" is zero for SQ0, and "x" is zero for AQ0. In step (120), the StEDC compares the store count of the arithmetic in AQx with the number, plus one, of the position of the store that it is checking for execution. For example, if the StEDC were checking the store in SQ1, then it would compare the store count of the instruction in the AQ with the number "2". If the store count is greater than or equal, then the store instruction came before the arithmetic instruction, and the store can be executed in step (122). If the store count is not greater than or equal, then the arithmetic instruction came first, and the StEDC goes to step (124). In step (124), The StEDC compares the target registers of the two instructions. If the two instructions have the same target register, the StEDC must go to step (126) and delay the store. If the target registers are not the same, then the StEDC goes to step (128) and increments "x". The StEDC then continues to step (120) now using the next instruction in the arithmetic instruction queue. The StEDC goes through this process for the first two stores in the SQ and executes the first store that is executable.

FIG. 5 is a flow chart of how the Arithmetic Execute Decision Control checks the instructions in the Arithmetic Instruction Queue. This figure shows the first few steps of checking the arithmetic instruction in AQ0. In step (200), the ArEDC checks whether the store count of the instruction in AQ0 is zero. If the store count is zero, the ArEDC goes to step (202) and executes the arithmetic in AQ0 because the arithmetic has no stores that precede it. If the store count is not equal to zero, then the ArEDC goes to step (204). Because a store precedes the arithmetic instruction, the ArEDC must compare the targets of the arithmetic in AQ0 and the store in SQ0. If the targets compare, the arithmetic must be delayed in step (206). If the targets do not compare, then the ArEDC goes on to step (208) and checks whether the store count of the instruction in AQ0 is equal to one. If it is equal to one, the ArEDC can execute the arithmetic in step (210) because the decision control has already checked the one preceding store in SQ0. If the store count is not equal to one, then the ArEDC must go to step (212). In step (212), the ArEDC compares the target of the arithmetic in AQ0 with the target of the store in SQ1. If the targets compare, then the ArEDC must go to step (214) and delay the arithmetic. If the targets do not compare, the ArEDC continues the process. If the arithmetic target register does not match any of the SQ target registers, the arithmetic can be executed even though it followed the stores in the original sequence.

Figure 6:
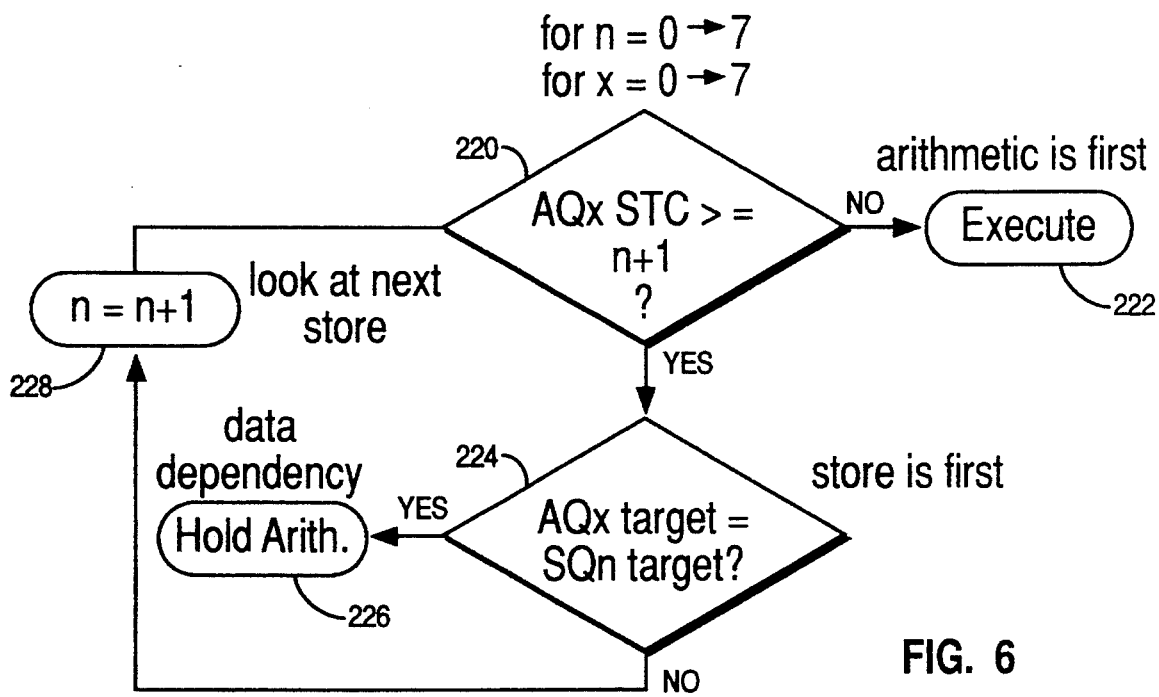
FIG. 6 is a flow chart illustrating the control of all the instructions in the queue in the arithmetic instruction execution unit.

FIG. 6 is a flow chart showing a condensed version of FIG. 5 for checking all of the instructions in the Arithmetic Instruction Queue. As in FIG. 4, the variable "x" stands for the position in the Arithmetic Instruction Queue and runs from 0 to 7. The variable "n" stands for the position in the Store Instruction Queue and also runs from 0 to 7. In the first iteration of step (220), "n" is zero for SQ0, and "x" is zero for AQ0. In step (220), the ArEDC compares the store count associated with the arithmetic in AQx with "n+1". If the store count is not greater than or equal to "n+1", then the store followed the arithmetic, and the arithmetic can be executed in step (222). If the store count is greater than or equal to "n+1", the ArEDC must continue to step (224) because the store came before the arithmetic instruction. In step (22), the ArEDC compares the target registers of the arithmetic and the store. If the two targets are the same, then the ArEDC must go to step (226) and delay the arithmetic until the store executes. If the targets do not match, the ArEDC goes to step (228) and increments "n". The ArEDC returns to step (220) and does the whole thing over again with the next store instruction. The ArEDC goes through this process for the first two arithmetics in the AQ and executes the first arithmetic that is executable.

Figure 7:
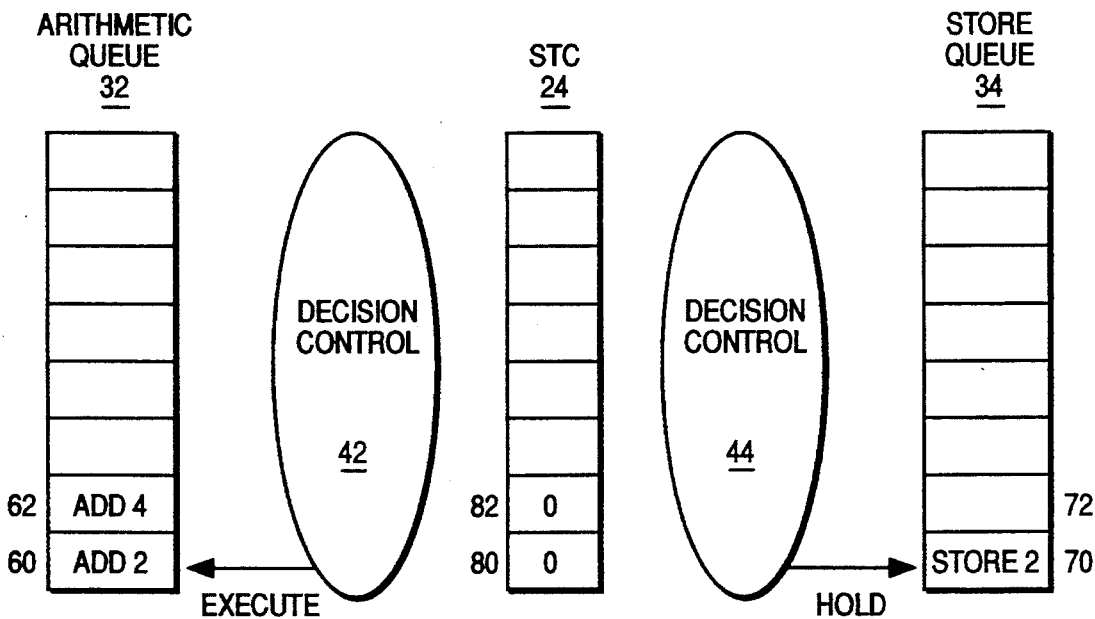
FIG. 7 is a block diagram illustrating an example of delaying an instruction in the bottom position of the queue in the store instruction execution unit.

FIG. 7 is a block diagram showing an example of delaying a store instruction in the Store Execution Unit. The instruction stream is two adds followed by a store. The first add has register 2 as its target, the second add has register as its target and the store has register 2 as its target (or source). As shown in FIG. 7, the first and second adds occupy the bottom two positions in the Arithmetic Instruction Queue, positions (60) and (62). The store occupies the bottom position in the Store Instruction Queue (70). The store counts associated with the arithmetic instructions are zero and are shown in positions (80) and (82) in the Store Count Field. The zero store count of the adds means that no stores preceded them. If the instructions were to be executed sequentially, both adds would execute before the store. In order for the store to execute before the adds, it must not have the same target register as the target of either of the two add instructions. Because the target of the add instruction in the bottom of the AQ is register 2, and the target of the store is register 2, the store must wait for the bottom add to execute.

Figure 8:
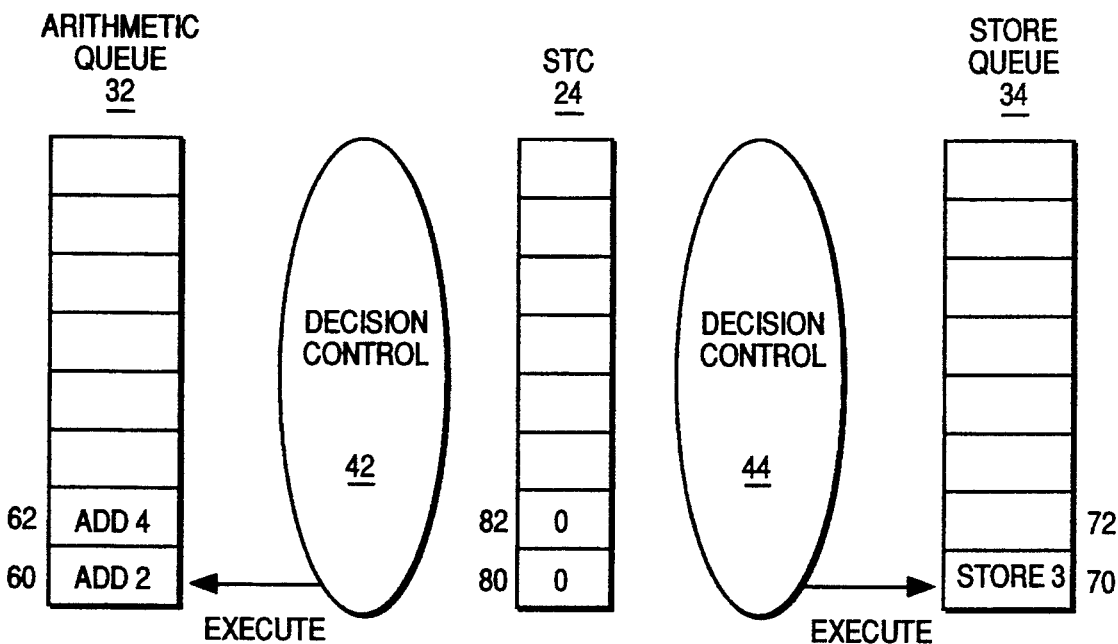
FIG. 8 is a block diagram illustrating an example of executing an instruction in the bottom position of the queue in the store instruction execution unit out of sequence.

FIG. 8 shows an example of a store instruction in the Store Execution Unit being executed in front of an instruction in the Arithmetic Execution Unit that originally preceded it. The instruction stream shown is two adds followed by a store. The first add has as its target register 2, the second add has as its target register 4, and the store has as its target register 3. The two adds occupy the bottom two positions in the arithmetic queue and the store occupies the bottom position in the store queue. As shown, the store count of both of the add instructions is zero. This means that if-the store is to execute before one or both of the two adds, it must not have the same target register as the target of one of the two add instructions. Because the store and the two adds do not have the same target registers, the store can execute before the two adds, which is out of order in the original sequence.

Figure 9:
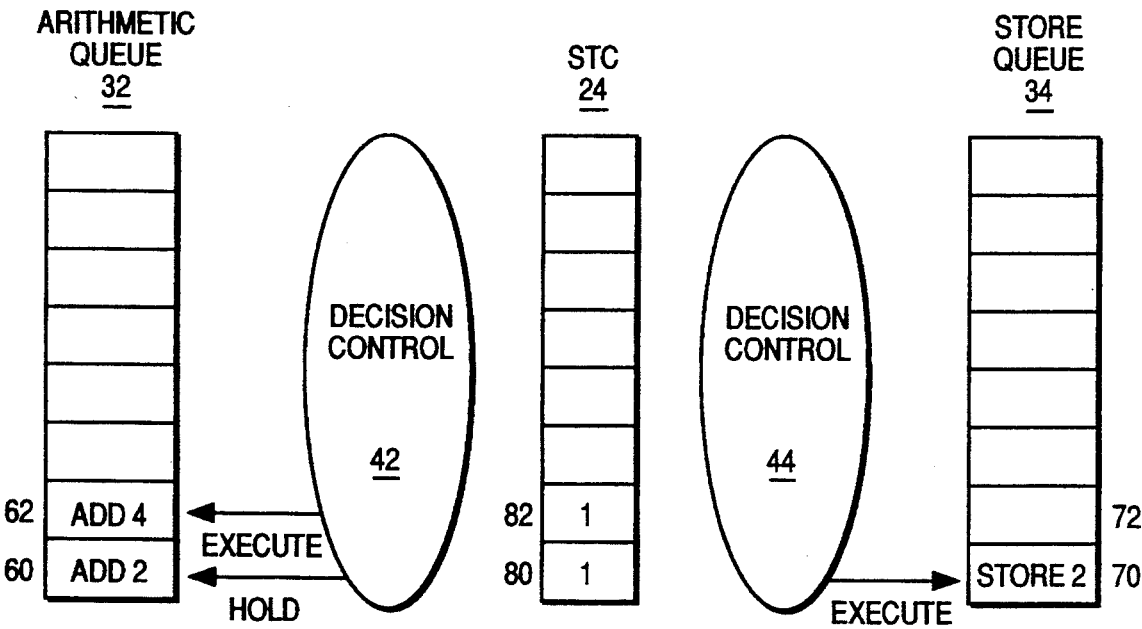
FIG. 9 is a block diagram illustrating an example of delaying an instruction in the bottom position of the queue in the arithmetic instruction execution unit and of executing the instruction in the second position of the queue in the arithmetic execution unit out of sequence.

FIG. 9 shows an example of an add instruction being delayed in the Arithmetic Execution Unit because of a preceding store. It also shows an add instruction executed out of sequence with another add in the Arithmetic Execution Unit. The instruction sequence in FIG. 9 is a store followed by two adds. The store has as its target register 2, the first add has as its target register 2, and the second add has as its target register 4. The two add instructions occupy the bottom positions in the Arithmetic Instruction Queue and the store occupies the bottom position in the Store Queue. The store count associated with each of the arithmetic instructions is one because there is one store preceding them. If either of the add instructions is to be executed, its target must be compared against the target of the store instruction. Because the add to target register 2 has the same target as the store, it must be delayed and wait for the store to execute. There is, however, no data dependency between the second add and the store, so the second add can execute. Thus, an add can be executed out of sequence with another add, as well as out of sequence with a store that preceded it.

Figure 10:
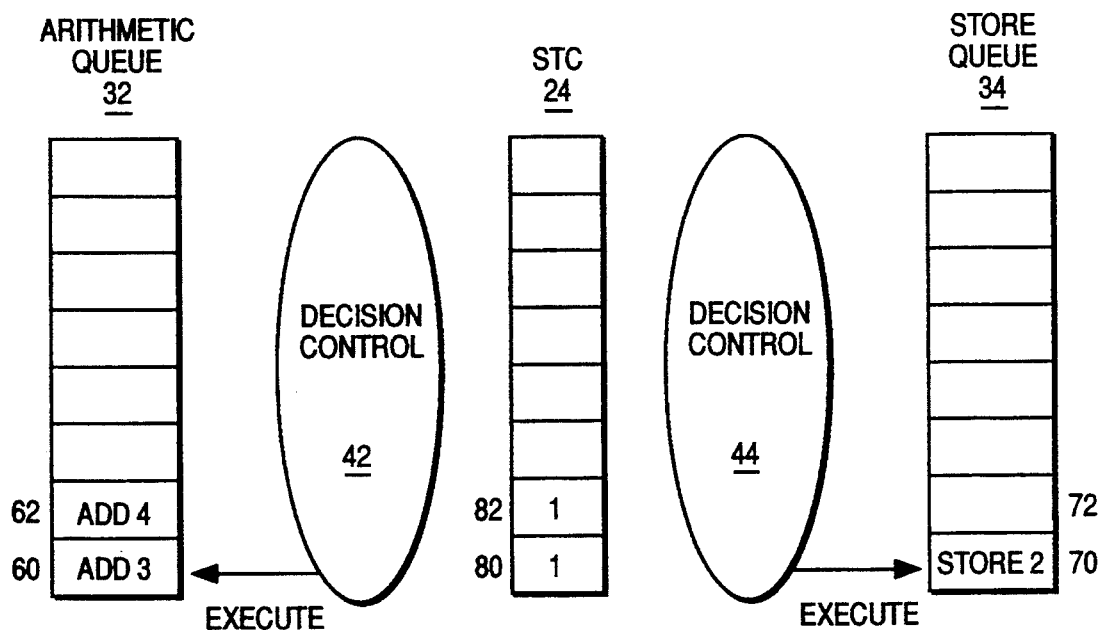
FIG. 10 is a block diagram illustrating an example of executing an instruction in the bottom position of the queue in the arithmetic instruction execution unit/out of sequence.

FIG. 10 is a block diagram of an example of an arithmetic instruction in the Arithmetic Execution Unit being executed prior to a store instruction in the Store Execution Unit that came before it. The instruction stream is a store followed by two adds. The target registers are register 2, register 3, and register 4, respectively. The store count for each of the arithmetic instructions .s one, because each has one store preceding it. The add in the bottom of the arithmetic queue can execute because its target register is 3, and the target register of the store in the store queue is 2.

Figure 11:
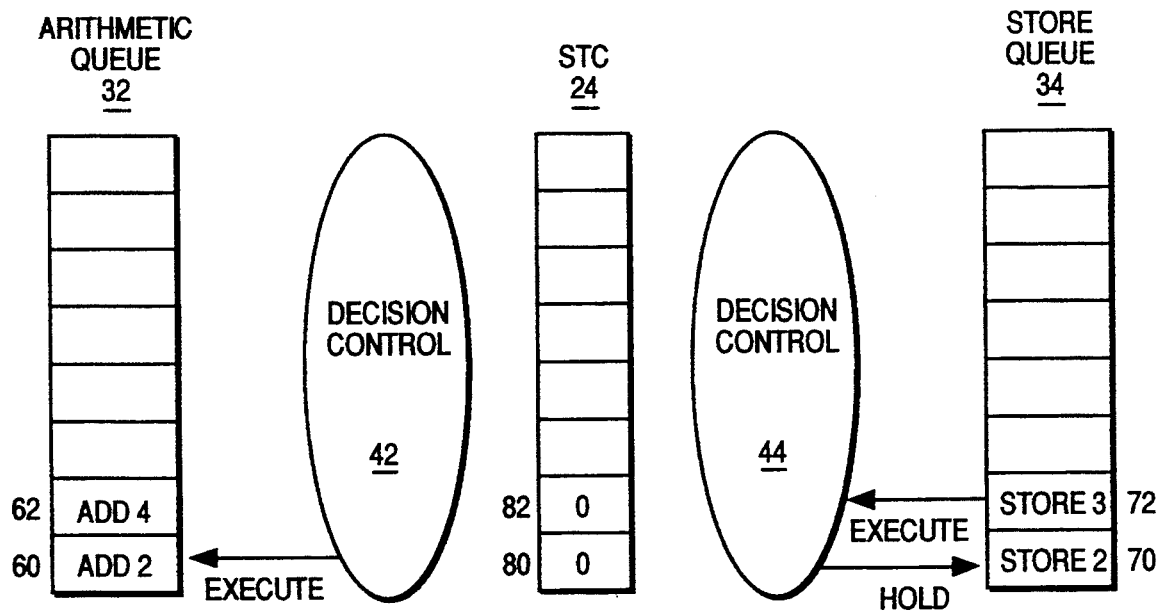
FIG. 11 is a block diagram illustrating an example of delaying an instruction in the bottom position of the queue in the store instruction execution unit and executing the instruction in the second position of the queue in the store execution unit cut of sequence.

FIG. 11 is a block diagram of an example of a store being executed out of sequence with another store that preceded it. The instruction stream is an add to register 2, an add to register 4, a store of register 2, and a store of register 3. The two stores occupy the bottom positions in the Store Instruction Queue and the two adds occupy the bottom positions in the Arithmetic Instruction Queue. The store count associated with each of the arithmetics is zero, because there are no stores that preceded the arithmetics in the original instruction stream. The store at the bottom of the store queue cannot be executed because the arithmetic at the bottom of the arithmetic queue also has a target register 2. Thus, the store must be delayed until the add executes. However, the store in the second position in the store queue can execute because there is no match. The store of register 3 can be executed before the store to register 2. Thus, a store can be executed out of sequence with another store, as well as out of sequence with an arithmetic that preceded it.

It should be apparent to one skilled in the art that this apparatus could be extended to allow an execution unit to execute instructions in its queue in any order as well as execute them out of sequence with instructions in another execution unit. The only delay occurs when an instruction to be executed in one unit must wait for an instruction in another unit to be executed.

While this invention has been described with reference to the illustrated embodiment, this description is not intended to be construed in a limiting sense. Various modifications of the illustrated embodiment, as well as other embodiments of the invention, will become apparent to those persons skilled in the art upon reference to this description. It is, therefore, contemplated that these appended claims will cover any modifications or embodiments as fall within the true scope of the invention.

We claim:

1. A data processing system, comprising:
   first and second execution units;
   means, coupled to said execution units, for providing instructions from a sequence of instructions to said execution units for execution;
   means, coupled to said execution units, for associating with a first instruction in said first execution unit a count of instructions in said second execution unit that preceded said first instruction in said sequence;
   means, coupled to said means for associating, for delaying execution of said first instruction until a second instruction in said second execution unit has completed execution, if:
      the count associated with said first instruction is non-zero; and
      said second instruction must execute prior to said first instruction to produce correct results; and means, coupled to said means for associating, for delaying execution of said second instruction until said first instruction has completed execution, if:
the count associated with said first instruction is less than or equal to a number of instructions in said second execution unit that precede said second instruction; and
said first instruction must execute prior to said second instruction to produce correct results.

2. A data processing system according to claim 1, wherein said instructions each belong to one of a plurality of classes of instructions.

3. A data processing system according to claim 2, wherein each of said execution units is dedicated to executing one of said classes of instructions.

4. A data processing system according to claim 3, further comprising means, connected to said means for providing, for determining the class of each instruction in said sequence of instructions.

5. A data processing system according to claim 4, wherein said means for providing further includes means for providing instructions belonging to a class of instructions exclusively to one of said execution units dedicated to executing said class of instructions.

6. A data processing system according to claim 1, wherein a first class of instructions is floating point arithmetic instructions and said first execution unit is dedicated to executing said first class of instructions, and a second class of instructions is floating point store instructions and said second execution unit is dedicated to executing said second class of instructions.

7. In a data processing system, a method of processing comprising the steps of:
providing instructions from a sequence of instructions to a first and second execution units for execution;
associating with a first instruction in said first execution unit a count of instructions in said second execution unit that preceded said first instruction in said sequence;
delaying execution of said first instruction until a second instruction in said second execution unit has completed execution, if:
the count associated with said first instruction is non-zero; and
said second instruction must execute prior to said first instruction to produce correct results; and
delaying execution of said second instruction until said first instruction has completed execution, if:
the count associated with said first instruction is less than or equal to a number of instructions in said second execution unit that precede said second instruction; and
said first instruction must execute prior to said second instruction to produce correct results.

8. A method of processing according to claim 7, wherein said instructions each belong to one of a plurality of classes of instructions.

9. A method of processing according to claim 8, wherein each of said execution units is dedicated to executing one of said classes of instructions.

10. A method of processing according to claim 9, further comprising the step of determining the class of each instruction in said sequence of instructions.

11. A method of processing according to claim 10, wherein said step of providing further includes providing instructions belonging to a class of instructions exclusively to one of said execution units.

12. A method of processing according to claim 7, wherein a first class of instructions is floating point arithmetic instructions and said first execution unit is dedicated to executing said first class of instructions, and a second class of instructions is floating point store instructions and said second execution unit is dedicated to executing said second class of instructions.

13. A data processing system, comprising:
a memory means for storing a plurality of instructions;
a processor means including:
first and second execution units, and
means, coupled to said execution units, for providing instructions from a sequence of instructions to said execution units for execution;
means for fetching instructions from said memory means and dispatching said instructions to said processor means;
means, coupled to said execution units, for associating with a first instruction in said first execution unit a count of instructions in said second execution unit that preceded said first instruction in said sequence;
means, coupled to said means for associating, for delaying execution of said first instruction until a second instruction in said second execution unit has completed execution, if:
the count associated with said first instruction is non-zero; and
said second instruction must execute prior to said first instruction to produce correct results; and
means, coupled to said means for associating, for delaying execution of said second instruction until said first instruction has completed execution, if:
the count associated with said first instruction is less than or equal to a number of instructions in said second execution unit that precede said second instruction; and
said first instruction must execute prior to said second instruction to produce correct results.

14. A data processing system according to claim 13, wherein said instructions each belong to one of a plurality of classes of instructions.

15. A data processing system according to claim 14, wherein each of said execution units is dedicated to executing one of said classes of instructions.

16. A data processing system according to claim 15, further comprising means, connected to said means for providing, for determining the class of each instruction in said sequence of instructions.

17. A data processing system according to claim 16, wherein said means for providing further includes means for providing instructions belonging to a class of instructions exclusively to one of said execution units dedicated to executing said class of instructions.

18. A data processing system according to claim 13, wherein a first class of instructions is floating point arithmetic instructions and said first execution unit is dedicated to executing said first class of instructions, and a second class of instructions is floating point store instructions and said second execution unit is dedicated to executing said second class of instructions.

* * * * *

UNITED STATES PATENT AND TRADEMARK OFFICE
CERTIFICATE OF CORRECTION

PATENT NO. : 5,363,495
DATED : November 8, 1994
INVENTOR(S) : Richard E. Fry, et. al.

It is certified that error appears in the above-indentified patent and that said Letters Patent is hereby corrected as shown below:

Col. 3, line 50, delete "unit/out", insert --unit out--;
     line 56, delete "cut", insert --out--; and
Col. 10, line 2, after "units" insert --dedicated to executing said class of instructions".

Signed and Sealed this

Eighth Day of April, 1997

BRUCE LEHMAN

Attest:

Attesting Officer

Commissioner of Patents and Trademarks